J. B. Williams.
Evaporating Pan.
No. 91,890. Patented Jan. 29, 1869.
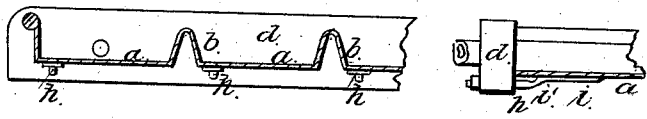
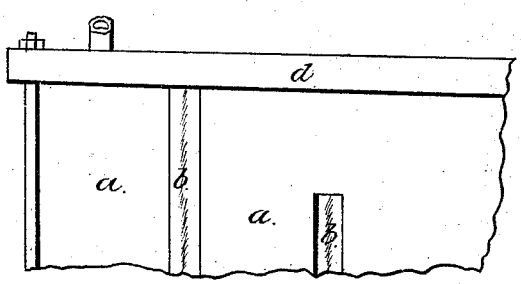
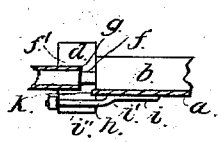  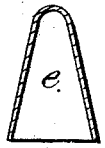
Witnesses:
E. W. Bliss
Inventor:
James B. Williams

United States Patent Office.

JAMES B. WILLIAMS, OF GLASTENBURY, ASSIGNOR TO THE HARTFORD SORGHUM-MACHINE COMPANY, OF HARTFORD, CONNECTICUT.

Letters Patent No. 91,890, dated June 29, 1869.

IMPROVEMENT IN EVAPORATING-PANS.

The Schedule referred to in these Letters Patent and making part of the same.

*To all whom it may concern:*

Be it known that I, JAMES B. WILLIAMS, of Glastenbury, county of Hartford, and State of Connecticut, have invented certain new and useful Improvements in the Manufacture of Evaporating-Pans; and to enable others skilled in the art to make and use the same, I will proceed to describe its construction, referring to the drawings, in which the same letters indicate like parts in each of the figures.

First, the nature of this invention consists in so connecting or compressing the edges of the corrugated bottom into the wood sides, as to effectually secure it from leakage.

Second, it further consists of set-off bolts, secured to the bottom of the pan, so as to allow the holes for their reception to be made a short distance from the groove that receives the bottom, to prevent leakage that would occur where the hole is made close to or connected to the groove for the bottom of the pan.

Third, it further consists in striking up caps of the exact size and shape of the corrugations, for the purpose of capping the ends of the corrugations, which are cut away alternately, first one, then the other, even with the bottom of the pan, to allow the liquid or sirup to pass from one end of the pan to the other.

Fourth, it further consists in boring a hole from the inside surface of the sides of the pan, near one end and just above the bottom of the pan, about the size of the inside diameter of the faucet, and about one-fourth the thickness of the plank, and a hole about the size of the outside diameter of said faucet from a centre directly opposite, to intersect with the first, to allow the faucet to be turned up firmly and closely against the shoulder, at the junction of the two size holes, the object of which is to secure against the possibility of leakage around the faucet.

In the accompanying drawings—

Figure 1 is a top view of an evaporating-pan.

Figure 2 is an under-side view of the same.

*a* is the bottom.

*b* are the corrugations or elevations, which extend alternately, first from one side, then to the other, seven-eighths of the distance, more or less, across the width of the bottom *b'*.

*c* are partitions, extending across the entire width of the pan, and are provided with gates *c'* to open and close passages formed in said partitions.

*d* are wood sides, into which are formed grooves or depressions, *k*, for the reception of the edges of the bottom and its corrugations.

*e* are caps, made or struck up in a die the exact size of the corrugations, for the purpose of producing uniformity of shape to the corrugations where they are cut away flush with the bottom, and to secure straight-edges to the bottom.

*f* is a hole, bored in the side plank, from the inside thereof, about one-fourth of its thickness, near one end of the pan, and in diameter about the size of the inside diameter of the faucet, and a second hole, *f'*, about the diameter of the outside of the faucet from a point on the outside, directly opposite of the first, to allow the end of the faucet to be turned up firmly and closely against the shoulder *g*, at the junction of the two holes, thereby preventing the liability of leakage around the edge of the bottom near the faucet.

*h* are set-off bolts, the strap *i* of which is secured to the under side of the pan. The set-off *i'* allows the hole *i''* to be bored a short distance below the groove *k*, formed in the side, for the reception of the bottom, the object of which is to prevent leakage from said groove around the bolt, as in the old way, where the bolt-hole is connected with the groove.

These pans are made ordinarily about nine feet wide, and the wood is protected from the fire by walls built up about twelve or fifteen inches from the sides of the pan for the support of the pan, and between which the fire or heat is brought in contact with the under side of the pan, to facilitate evaporation.

I believe I have thus shown the nature, construction, and advantage of this invention, so as to enable others skilled in the art to make and use the same.

What I claim, therefore, and desire to secure by Letters Patent, is—

1. Forming grooves, *k*, formed in the sides *d*, in combination with a corrugated bottom, constructed and arranged substantially as described.

2. The set-off bolts *h*, in combination with a corrugated bottom, *b'*, and sides *d*, substantially as and for the purpose described.

3. The caps *e*, constructed as described, in combination with the corrugated bottom *b'* and sides *d*, substantially as and for the purpose described.

4. Forming a union of the faucet with the corrugated pan through the side *d*, substantially in the manner and for the purpose described.

JAMES B. WILLIAMS. [L. S.]

Witnesses:
E. W. BLISS,
JEREMY W. BLISS.